Patented Dec. 9, 1930

1,784,441

UNITED STATES PATENT OFFICE

RICHARD HERZ, OF FRANKFORT-ON-THE-MAIN, AND MAX SCHUBERT, OF FECHENHEIM, NEAR FRANKFORT-ON-THE-MAIN, GERMANY, ASSIGNORS TO GENERAL ANILINE WORKS, INC., OF NEW YORK, N. Y., A CORPORATION OF DELAWARE

PROCESS FOR MANUFACTURING ORTHO-AMINO-ARYLMERCAPTANES

No Drawing. Application filed March 21, 1928, Serial No. 263,584, and in Germany March 26, 1927.

We have found an almost generally applicable method for producing ortho-aminoarylmercaptanes of the general formula:

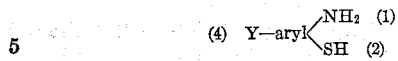

wherein Y means that the 4-position is either substituted or blockaded. Our process consists in treating ortho-aminoaryl-sulfocyanogen compounds of the general formula:

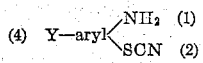

wherein Y has the aforesaid signification, obtainable e. g. by causing an inorganic sulfocyanic salt and a halogen to act on a primary aromatic amine having the para-position to the amino group blocked in the presence of a solvent of a neutral character, with alkaline saponifying agents, under exclusion of air, preferably in the presence of a reducing agent. Advantageously alkaline acting agents having simultaneously a reducing effect as for instance an aqueous or alcoholic solution of alkali sulfides or polysulfides may be used for our process.

The ortho-aminoarylmercaptanes, thus obtained in a smooth reaction have all characteristic properties of this class of intermediates for the production of dyestuffs of the thioindigo series, particularly they form with solutions of salts of heavy metals difficultly soluble mercaptides and yield in a smooth reaction the corresponding ortho-aminoarylthioglycolic acids when condensed with monochloroacetic acid. Advantageously one may directly use for this latter condensation the alkaline solutions of the mercapto compounds obtained according to our process without isolating the mercapto-compounds themselves.

In order to further illustrate our invention the following examples are given, the parts being by weight and all temperatures in centigrade degrees. But we wish to be understood that we are not limited to the products nor reaction conditions mentioned therein.

Example 1

40 parts of 1-methyl-2-amino-3-sulfocyanogen-5-chloro-benzene, obtained e. g. by the action of potassium sulfocyanide and bromine on 1-methyl-2-amino-5-chloro-benzene in the presence of methylalcohol, are suspended in 400 parts of spirit and mixed with 140 parts of a dilute caustic soda solution containing 24 parts of sodium hydroxide, advantageously with addition of 10 parts of sodium hydrosulfite or the equivalent amount of zinc dust. Then the mass is warmed for a short time while stirring. When the reaction is finished, the spirit is advantageously distilled off. The residual aqueous solution contains the 1-methyl-2-amino-5-chloro-benzene-3-mercaptane of the formula:

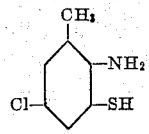

in the form of its sodium salt. In order to obtain it in a stable state it may be precipitated therefrom in the usual manner as the difficulty soluble zinc mercaptide by the addition of a soluble zinc salt. In order to obtain the corresponding aminothioglycolic acid the solution of the sodium mercaptide as such is diluted with water and mixed with an aqueous solution of 25 parts of the sodium salt of the monochloro-acetic acid. Thus the sodium salt of the 1-methyl-2-amino-5-chloro-benzene-3-thioglycolic acid corresponding to the formula:

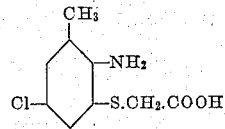

is formed which is advantageously isolated in the form of its inner anhydride melting at about 186°.

The saponification of the sulfocyanogen compound may be carried out with the same result by means of an aqueous or alcoholic solution of alkali sulfides or polysulfides.

Example 2

40 parts of 1-amino-2-sulfocyanogen-4-ethoxy-benzene, obtainable e. g. according to the above mentioned process by starting from paraphenetidine, are introduced into a solution of 32 parts of sodium sulfide and 8 parts of sulfur in 200 to 300 parts of spirit and the mass is boiled under a reflux condenser for a short time. Then the spirit is distilled off, the residue is dissolved in 500 parts of water and precipitated by addition of an acid to the solution. For purifying the precipitate may be redissolved in a dilute caustic soda solution, advantageously with addition of a small quantity of a reducing agent, and the solution is separated from the remaining sulfur by filtration. This solution contains the 1-amino-4-ethoxybenzene-2-mercaptane of the formula:

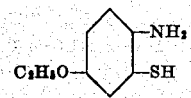

in the form of its sodium salt and yields when condensed with monochloroacetic acid according to Example 1 the 1-amino-4-ethoxy-benzene-2-thioglycolic acid. The mercapto-compound may be isolated as its difficultly soluble zincmercaptide.

*Example 3*

When starting from 40 parts of 1-sulfocyanogen-2-amino-naphthalene obtainable e. g. according to the above mentioned process by starting from beta-naphthylamine and working otherwise as described in Example 1, the 2-aminonaphthalene-1-mercaptane of the formula:

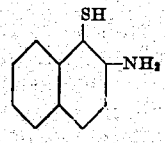

is obtained. By condensation with monochloro-acetic acid it is converted into the 2-amino-naphthalene-1-thioglycolic acid.

We claim:

1. A process for manufacturing ortho-amino-arylmercaptans which comprises treating an ortho-amino-aryl-sulfocyanogen compound of the general formula:

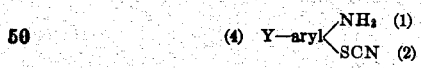

wherein Y means that the 4-position is either substituted or blockaded with an alkaline saponifying agent under exclusion of air.

2. A process for manufacturing ortho-amino-arylmercaptans which comprises treating an ortho-amino-aryl-sulfocyanogen compound of the general formula:

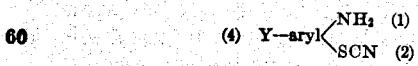

wherein Y means that the 4-position is either substituted or blockaded with an alkaline saponifying agent with the addition of a reducing agent.

3. A process for manufacturing ortho-amino-arylmercaptans which comprises treating an ortho-amino-aryl-sulfocyanogen compound of the general formula:

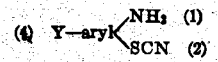

wherein Y means that the 4-position is either substituted or blockaded with an alkaline saponifying agent being capable of exerting a reducing action.

4. A process for manufacturing ortho-amino-aryl-mercaptans which comprises treating an ortho-amino-aryl-sulfocyanogen compound of the general formula:

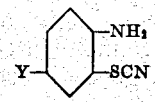

wherein Y means a monovalent substituent and the benzene nucleus may contain further substituents with an alkaline saponifying agent under exclusion of air.

5. A process for manufacturing ortho-amino-aryl-mercaptans which comprises treating an ortho-amino-aryl-sulfocyanogen compound of the general formula:

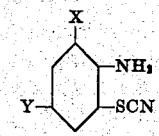

wherein X means hydrogen or alkyl and Y means alkoxy or halogen, with an alkaline saponifying agent under exclusion of air.

6. A process for manufacturing 1-methyl-2-amino-5-chloro-benzene-3-mercaptan which comprises treating 1-methyl-2-amino-3-sulfocyanogen-5-chloro-benzene of the formula:

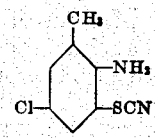

with an alkaline saponifying agent under exclusion of air.

In testimony whereof, we affix our signatures.

RICHARD HERZ.
MAX SCHUBERT.